United States Patent [19]

Katz

[11] Patent Number: 5,870,970
[45] Date of Patent: Feb. 16, 1999

[54] WATER SUPPLY SYSTEM AND METHOD PARTICULARLY USEFUL FOR POULTRY HOUSES, AND WATER PRESSURE REDUCER FOR USE IN SUCH SYSTEM AND METHOD

[75] Inventor: Oded Katz, DN Menashe, Israel

[73] Assignee: Plasson Maagan Michael Industries Ltd., Kenashe, Israel

[21] Appl. No.: 435,430

[22] Filed: May 10, 1995

[30] Foreign Application Priority Data

May 25, 1994 [IL] Israel ........................................ 109786

[51] Int. Cl.$^6$ .................................................... A01K 39/02
[52] U.S. Cl. ................................................................ 119/72
[58] Field of Search ............................. 119/72, 72.5, 75, 119/450, 527; 137/540, 543.17, 543.23

[56] References Cited

U.S. PATENT DOCUMENTS

| | | | |
|---|---|---|---|
| 3,051,196 | 8/1962 | Miller | 137/543.23 |
| 3,537,430 | 11/1970 | Peppler | 119/72.5 |
| 4,546,790 | 10/1985 | Huber et al. | 137/540 |
| 4,682,625 | 7/1987 | Christopher | 137/543.23 |
| 4,889,151 | 12/1989 | Oten | 137/543.17 |
| 5,136,983 | 8/1992 | Hostetler et al. | 119/72 |
| 5,161,572 | 11/1992 | Oberl et al. | 137/516.27 |
| 5,247,963 | 9/1993 | Hostetler | 119/72 |
| 5,289,797 | 3/1994 | Steudler, Jr. | 119/72 |
| 5,339,768 | 8/1994 | Schumacher | 119/72 |

OTHER PUBLICATIONS

E–Z SIP #1025 Floor Watering System Installation, Operation and Maintenance Manual, Date Coded Jul. 1989, ©1989.

E–Z SIP #1400 Floor Watering System Installation, Operation and Maintenance Manual, Date Coded Nov. 1991, ©1991.

Ziggity Systems Ziggity–Flo Regulators, The Solution To Efficient Water Management, Date Coded Jan. 1991, ©1991.

*Primary Examiner*—Robert P. Swiatek
*Assistant Examiner*—Elizabeth Shaw
*Attorney, Agent, or Firm*—Benjamin J. Barisi

[57] ABSTRACT

A water supply system and method for supplying water to a plurality of water utilization devices, particularly poultry drinkers, supported over a floor extending at a predetermined slope, includes a water supply conduit extending over and substantially parallel to the floor, and a plurality of pressure reducers in the water supply conduit at spaced intervals along its length. Each pressure reducer reduces the water pressure a predetermined amount according to the slope of the span of the water supply conduit from the respective pressure reducer to the next adjacent one upstream of the water supply conduit.

20 Claims, 3 Drawing Sheets

WATER SUPPLY SYSTEM AND METHOD PARTICULARLY USEFUL FOR POULTRY HOUSES, AND WATER PRESSURE REDUCER FOR USE IN SUCH SYSTEM AND METHOD

FIELD AND BACKGROUND OF THE INVENTION

The present invention relates to a water supply system and method, and also to a water pressure reducer for use in such system and method. The invention is particularly useful for poultry houses for supplying water to a plurality of water drinkers for poultry, and is therefore described below with respect to such application.

Poultry drinkers in poultry houses are supplied by a water supply conduit extending over the poultry house floor. The floors of such poultry houses are generally built with a predetermined slope from one end to the opposite end for drainage purposes; and when the water supply conduit is suspended at the same slope over the floor so as to be parallel with the floor, the slope produces an increase in pressure along the length of the water supply conduit. This would normally produce the undesirable result of supplying water to the drinkers at the lower end of the water supply conduit at a higher flow rate than at the upper end. Such an undesirable result is generally corrected by providing pressure regulators along the length of a conduit to maintain the same pressure along its length, or a flow regulator at each of the water drinkers to maintain the same flow rate at each drinker irrespective of the water pressure thereat. However, in such installations the water is usually supplied to the poultry at different rates according to their stage of growth; i.e., at a lower rate while they are young chicks, and at an increasing rate as they grow towards maturity. When pressure or flow regulators are used, this would require readjusting the individual regulators for different rates according to the stage of growth of the poultry.

OBJECTS AND BRIEF SUMMARY OF THE INVENTION

An object of the present invention is to provide a water supply system and method for supplying water to a plurality of water utilization devices, such as poultry drinkers, having advantages in the above respects. Another object of the invention is to provide a pressure reducer particularly useful in such system and method.

According to one aspect of the present invention, there is provided a water supply system for supplying water to a plurality of water utilization devices within an enclosure having a floor extending at a predetermined slope from one end to the opposite end thereof, the water supply system comprising: a water supply conduit extending over the floor substantially parallel thereto so as to have substantially the same slope as the floor; a plurality of connectors in the water supply conduit at spaced intervals along the length thereof for connection to the water utilization devices; and a plurality of pressure reducers included in the water supply conduit at spaced intervals along its length, each pressure reducer introducing a fixed pressure drop ($\Delta P$), irrespective of the water pressure in the water supply conduit, reducing the water pressure in the water supply conduit a predetermined amount according to the slope of the span of the water supply conduit from that pressure reducer to the next adjacent pressure reducer upstream of the water supply conduit, thereby obviating the need for readjusting the pressure reducers when changing flow rates to the water utilization devices.

In the described preferred embodiment, the pressure reducers are included in the water supply conduit at equally-spaced intervals and reduce the water pressure by equal amounts.

According to another aspect of the invention, there is provided a method of supplying water to a plurality of water utilization devices within an enclosure having a floor extending at a predetermined slope from one end to the opposite end thereof, comprising: extending a water supply conduit over the floor substantially parallel thereto so as to have substantially the same slope as the floor; connecting a plurality of pressure reducers into the water supply conduit at spaced intervals along the length thereof, each pressure reducer introducing a fixed pressure drop ($\Delta P$), irrespective of the water pressure in the water supply conduit, reducing the water pressure in the water supply conduit a predetermined amount according to the slope of the span of the water supply conduit from that pressure reducer to the next adjacent pressure reducer upstsream of the water supply conduit; thereby obviating the need for readjusting the pressure reducers when changing flow rates to the water utilization devices and connecting a plurality of water utilization devices to the water supply conduit at spaced intervals along the length thereof.

The foregoing features of the invention enable water supply systems to be provided, particularly for water drinkers in poultry houses, which supply water to the water drinkers at a substantially uniform rate irrespective of the location of the water drinker in the poultry house, and which also permit the rate to be varied whenever desired by merely adjusting the water inlet pressure, e.g., to decrease the water rate when the poultry are young chicks and to increase the rate gradually as they develop towards maturity, without having to readjust individual pressure or flow regulators when the feeding rate is to be changed.

The invention also provides a pressure reducer particularly useful in the above described system and method.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
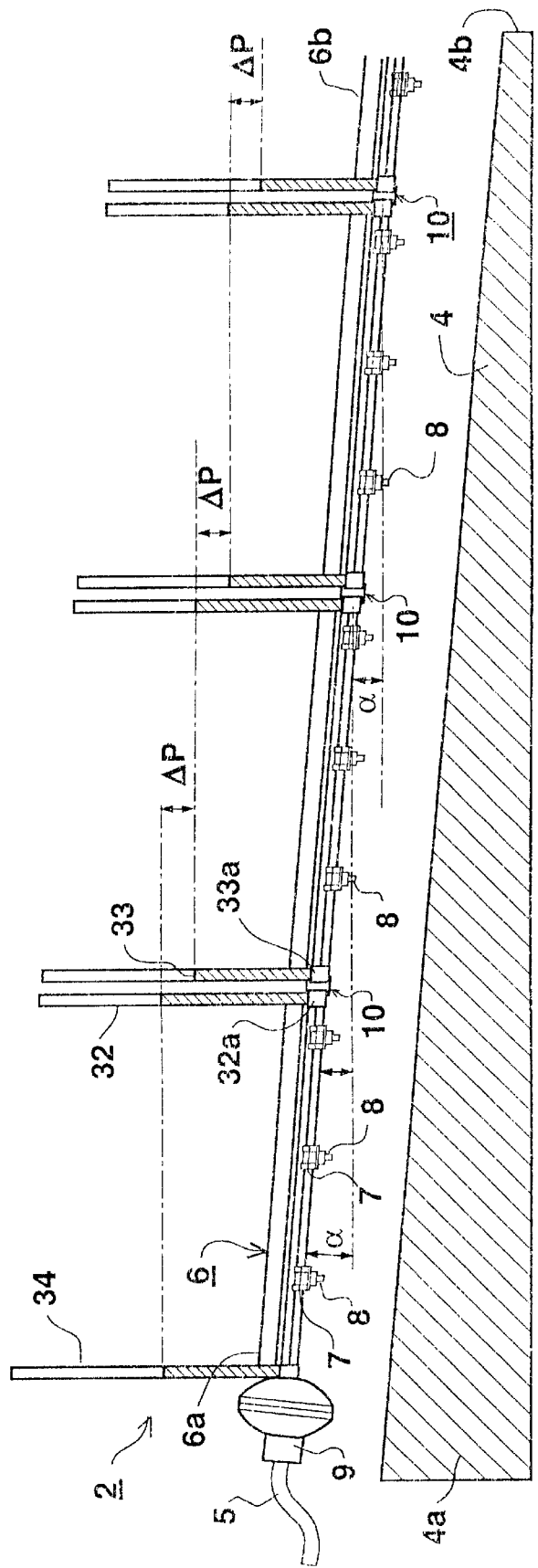
FIG. 1 illustrates one form of water supply system constructed in accordance with the present invention.

FIG. 1 illustrates a water supply system for supplying water to a plurality of poultry drinkers within a poultry house, generally designated 2, having a floor 4 extending at a predetermined slope, indicated by angle $\alpha$, from one end 4a to the opposite end 4b of the poultry house. The slope of floor 4 in FIG. 1 is somewhat exaggerated. In a typical poultry house, the floor may have a one percent (approximately 1.7 degrees) slope for purposes of drainage, such that in a 100 meter floor, the far end would be about one meter lower than the near, inlet end.

The water supply system provided in such a poultry house includes a water supply pipe 5 supplying water to a conduit 6, typically suspended from the ceiling of the poultry house, and extending over the floor substantially parallel thereto so as to have substantially the same slope as the floor. The water supply conduit 6 includes a plurality of connectors 7 at spaced intervals along its length for connection to poultry water drinkers 8. In the example illustrated in FIG. 1, the poultry water drinkers 8 are in the form of drinking nipples accessible to the poultry for receiving drinking water.

Such water supply systems for poultry drinkers, and the poultry drinkers connected into such a system, are well known, and therefore further details of the construction of such a water supply system and their drinkers are not set forth herein.

The water supply conduit 6 includes, at its inlet end 6a, a pressure regulator 9 for regulating the inlet pressure in case of fluctuations in the line pressure and for controlling the flow rate of the poultry drinkers, via the line pressure, according to the poultry age and size. However, because of the slope of the water supply conduit 6, the pressure at the poultry drinkers 8 at the lower end 6b of the conduit will be higher than those upstream of the conduit towards the inlet end 6a; therefore, the water feeding rate would be larger in the poultry drinkers at the lower end unless the feeding rates of the poultry drinkers are adjusted, either manually, or automatically in response to flow. However, if adjusted automatically, as by the provision by a plurality of pressure regulators along the length of conduit 6, or a flow regulator for each poultry drinker, whenever a change in the flow rate is desired for all the drinkers connected to the water supply conduit (e.g., in order to increase the flow rate as the poultry develop towards maturity), it would be necessary to individually readjust the pressure or flow regulators each time a change is desired.

In order to solve the above problem, the water supply conduit 6 illustrated in FIG. 1 includes a plurality of pressure reducers, each generally designated 10, at spaced intervals along the length of the water supply conduit. Each pressure reducer drops the water pressure in the water supply conduit a predetermined amount, according to the slope of the span of the water supply conduit from that pressure reducer to the next adjacent one upstream of the water supply conduit. In the example illustrated in FIG. 1, the slope is uniform, and the pressure reducers are located at equally-spaced intervals in the water supply conduit 6, and therefore the pressure reducers 10 reduce the water pressure equal amounts. For example, in a water supply conduit 6 of 100 meters length, with a one percent slope, the water supply conduit could include six pressure reducers 10, each effective to reduce the pressure by about 15–18 cm water head, as shown at $\Delta P$ in FIG. 1.

Figure 2:
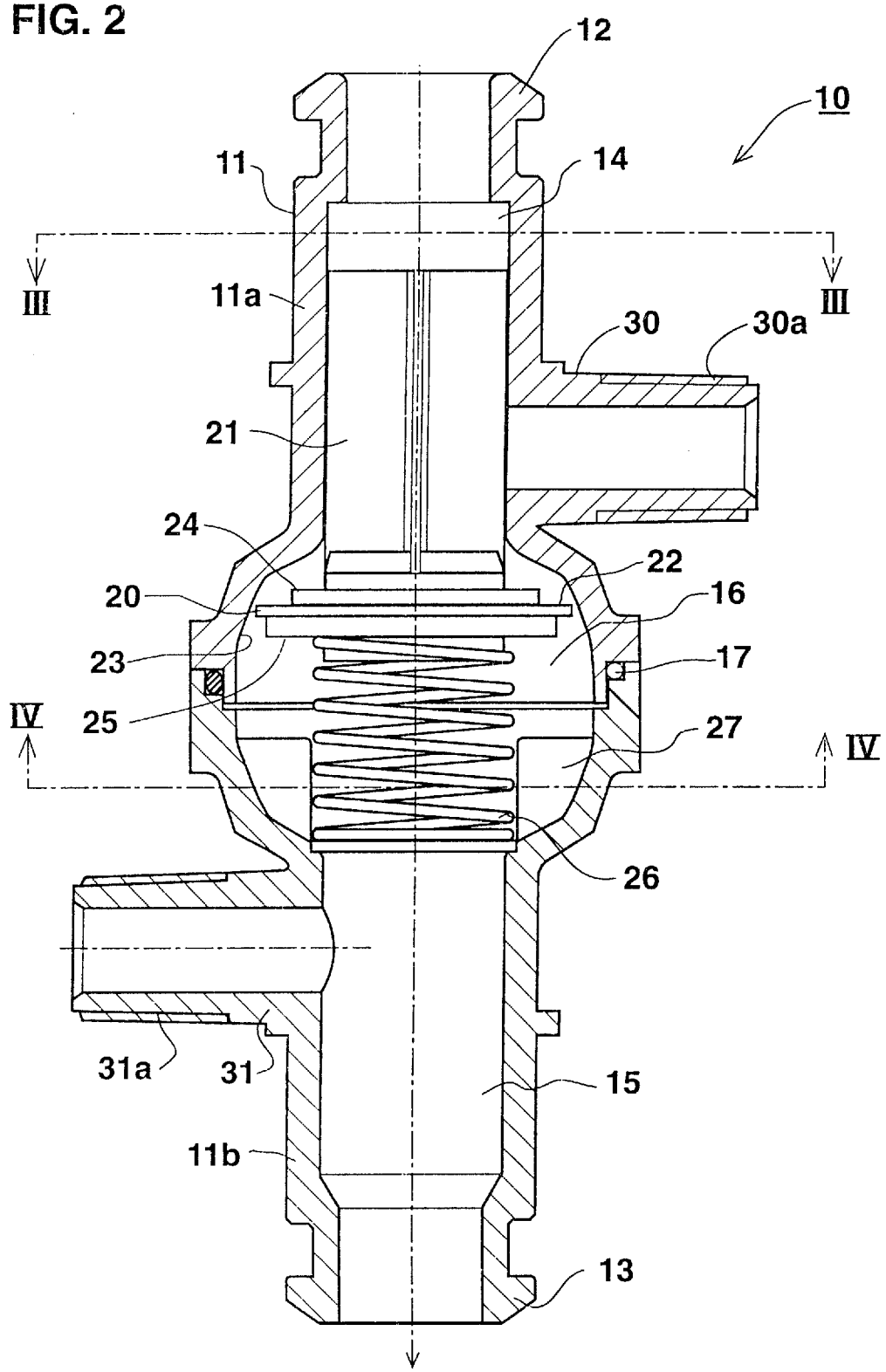
FIG. 2 is an enlarged longitudinal sectional view of one of the pressure reducers in the water supply system of FIG. 1.
Figure 3:
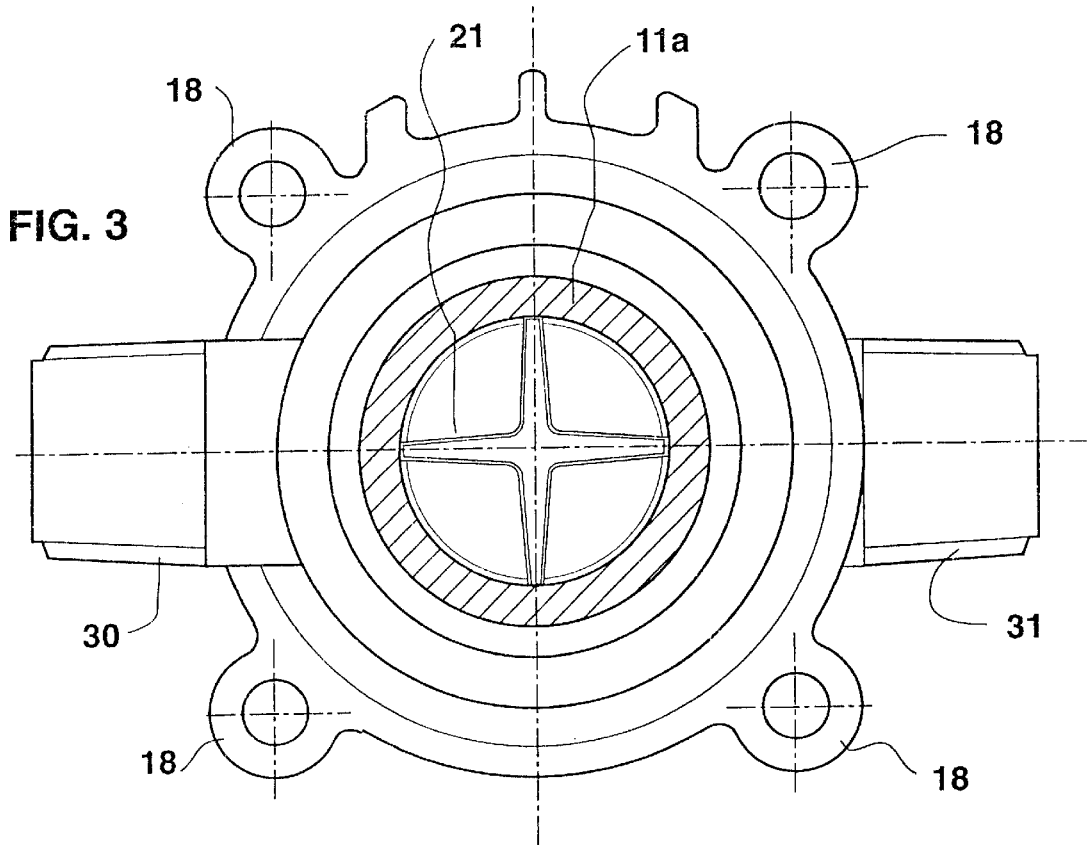
FIGS. 3 and 4 are transverse sectional views along lines III—III and IV—IV, respectively, of the pressure reducer of FIG. 2.
Figure 4:
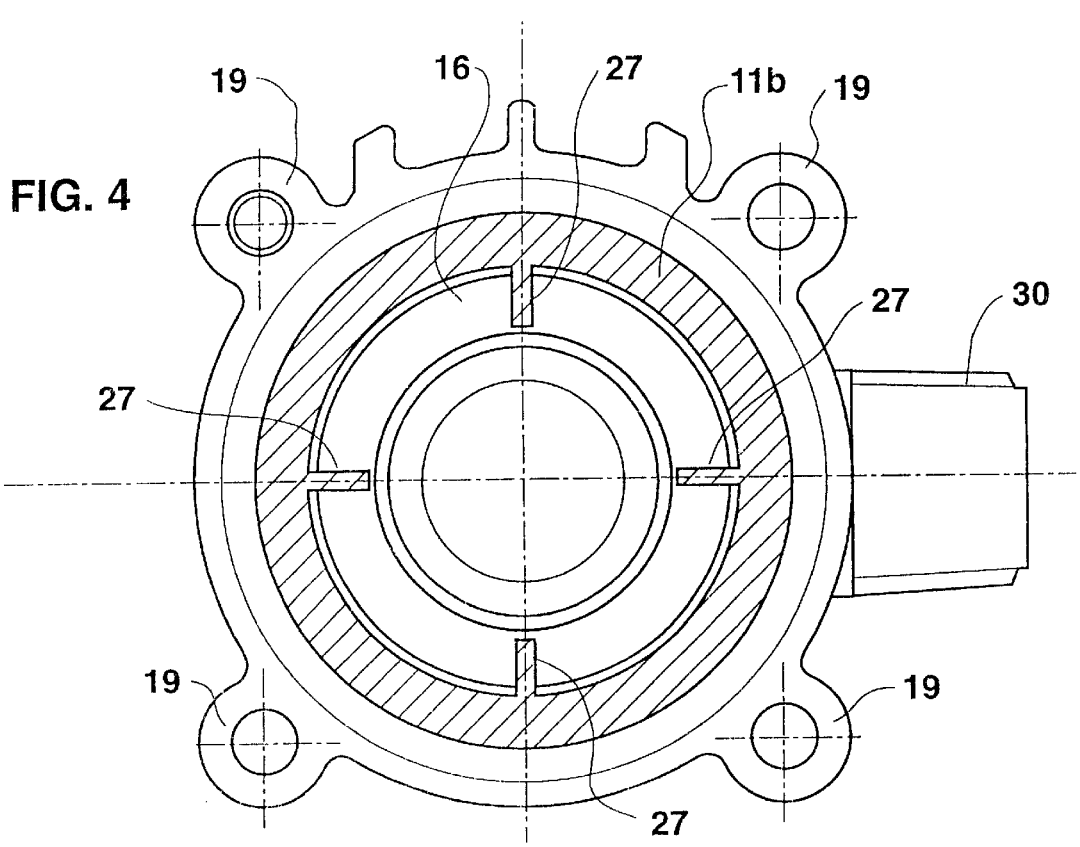

The structure of each of the pressure reducers 10 is more particularly illustrated in FIGS. 2–4.

Each pressure reducer 10 includes a housing 11 formed with an inlet 12 at one end, and an outlet 13 at the opposite end in line with the inlet. The inlet 12 and outlet 13 are connected together by a passageway defined by cylindrical bores 14 and 15 at the inlet and outlet, respectively, and an internal chamber 16 between the two bores and of larger transverse dimensions than the two bores. For this purpose, housing 11 may be constructed of two half-sections 11a, 11b, split through the internal chamber 16 and joined to each other with a sealing ring 17 interposed between the two half-sections. The two half-sections may be formed with apertured tabs, as shown at 18 and 19 in FIGS. 3 and 4, respectively, for receiving fasteners joining the two sections together.

A displaceable valve assembly, generally designated 20, is disposed within housing 11 to restrict or enlarge the passageway between the inlet 12 and the outlet 13. Valve assembly 20 includes a guiding stem 21 slidable within the cylindrical bore 14 of the housing, and an enlarged valve member 22 located within the large internal chamber 16 and cooperable with an internal surface 23 of chamber 16 for restricting or enlarging the passageway between the inlet 12 and outlet 13. Valve member 22 is in the form of a rubber disc fixed on the guiding stem 21 between a washer 24 and an enlarged end 25 of the guiding stem.

As shown in FIG. 2, surface 23 of internal chamber 16, with which valve member 22 cooperates to enlarge or restrict the passageway between inlet 12 and outlet 13, is of a tapered configuration increasing in transverse dimension towards the outlet 13. As shown in FIG. 3, the guiding stem 21 slidable within cylindrical bore 14 is of a spider cross-section for its complete length to the washer 24, in order to provide a flow path for the water from the inlet 12 into the internal chamber 16 on the inlet side thereof with respect to valve member 22.

A coil spring 26 is located within internal chamber 16 between the valve assembly 20 and the outlet side of that chamber, and urges the valve assembly in the direction of the inlet 12, i.e., to press the outer edge of valve member 22 against the inner face 23 of internal chamber 16. It will thus be seen that the water pressure at inlet 12 urges the valve assembly 20 towards the outlet 13 of the housing, thereby enlarging the passageway between the outer edge of valve member 22 and the internal surface 23 of chamber 16; whereas the pressure at the outlet 13, as well as the force of spring 26, both urge the valve assembly in the opposite direction, tending to restrict the passageway between the outer edge of valve member 22 and inner surface 23 of chamber 16.

Housing 11 further includes four axially-extending, circumferentially-spaced stops 27, shown particularly in FIGS. 2 and 4, projecting radially inwardly of the internal chamber 16 around the mouth of the cylindrical bore 15 leading to the housing outlet 13. These stops 27 are engageable by the enlarged end 25 of valve assembly 20 to limit the displacement of that assembly, and thereby to prevent the assembly from completely closing the outlet 13.

Pressure reducer 10 further includes a horizontally-extending connector 30 integrally formed in housing section 11a adjacent the inlet 12, and a second, horizontally-extending connector 31 integrally formed in housing section 11b adjacent the outlet 13. The two connectors 30, 31 are externally threaded, as shown at 30a and 31a, respectively, and each is adapted to receive a vertical tube 32, 33, via an elbow or tee fittings 32a, 33a (FIG. 1), to extend vertically upwardly. Tubes 32, 33 serve as visual indicators for visually indicating the difference in pressure at the outlet 13 with respect to the inlet 12. For this purpose, the vertical tubes 32, 33 are either transparent, or at least include a transparent section, to enable the level of the water within the respective tube to be seen by an observer. A further vertical tube 34 is provided at the outlet end of the pressure regulator 9 to indicate the inlet pressure.

The operation of the water supply system illustrated in the drawings will be apparent from the above description. Thus, the water supply conduit 6 is mounted to overlie the floor 4 of the poultry enclosure 2, as by suspending it from the ceiling of the poultry enclosure, such that the conduit is substantially parallel to the floor 4 and is therefore at the same slope as the floor. As indicated earlier, in a typical installation the floor would be at a slope of about one percent, such that in a water supply conduit of 100 meters in length, the far end 6b of the water supply conduit would be about one meter lower than the inlet end 6a of the conduit.

Pressure regulator 9 is connected to the inlet end of the water supply conduit 6 in order to regulate the pressure therein thus controlling the flow rate to the poultry drinkers despite fluctuations in the water supply pressure. The pressure reducers 10 are connected into the conduit at spaced intervals along its length. Each pressure reducer 10 reduces the water pressure in the water supply conduit a predetermined amount, defined by the force of the spring 26 which continuously biasses the valve assembly by a constant force corresponding to the predetermined pressure drop ($\Delta P$) to be produced by the pressure reducer. This predetermined amount is determined by the slope of the span of the water supply conduit from the respective pressure reducer to the next adjacent one upstream of the water supply conduit, so that the pressure in the water supply conduit will vary only slightly along its complete length from its inlet end 6a to its outlet end 6b. In the example described above involving a water supply conduit of 100 meters in length and of a slope of one percent, the pressure drop produced by each pressure reducer 10 would be from 15–18 cm of water. This pressure drop can be visually seen by the difference in levels of the water in the two vertically-extending tubes 32, 33 at the respective ends of each pressure reducer 10.

The poultry drinkers 8, for example drinking nipples, connected at spaced intervals in the water supply conduit 6 via connectors 7, will thereby produce a substantially uniform rate of feed of the water irrespective of their location in the water supply conduit 6. Moreover, if it is desired to increase (or decrease) the rate of feed of the water, for example for supplying water at a higher rate during the development of the poultry to maturity, this may be easily done by merely increasing the rate of feed of the water through the inlet of the water supply conduit 6, e.g., by adjusting or replacing the pressure regulator 9, without adjusting the rate of feed of the individual water drinkers 8.

While the invention has been described with respect to one preferred embodiment, it will be appreciated that many variations, modifications are other applications of the invention may be made.

I claim:

1. A water supply system for supplying water to a plurality of water utilization devices having a floor extending at a predetermined slope from one end to the opposite end thereof, said water supply system comprising:
a water supply conduit extending over said floor substantially parallel thereto so as to have substantially the same slope as the floor;
a plurality of connectors in said water supply conduit at spaced intervals along the length thereof for connection to said water utilization devices;
and a plurality of pressure reducers included in said water supply conduit at spaced intervals along its length, each pressure reducer introducing a fixed pressure drop, irrespective of the water pressure in the water supply conduit, reducing the water pressure in the water supply conduit a predetermined amount according to the slope of the span of the water supply conduit from that pressure reducer to the next adjacent pressure reducer upstream of the water supply conduit, thereby obviating the need for readjusting the pressure reducers when changing flow rates to the water utilization devices.

2. The system according to claim 1, wherein said pressure reducers are included in the water supply conduit at equally-spaced intervals and reduce the water pressure equal amounts.

3. The system according to claim 1, wherein each of said pressure reducers comprises a housing having an inlet and an outlet connected to the inlet via a passageway; and a displaceable member within the housing urged by the pressure of the inlet for enlarging said passageway, and by the pressure at the outlet for restricting said passageway; said displaceable member being continuously biassed by a predetermined constant force, corresponding to the pressure to be reduced by the pressure reducer, for restricting said passageway.

4. The system according to claim 3, wherein said displaceable member is continuously biassed by a spring.

5. The system according to claim 3, wherein said housing further includes a visual indicator for visually indicating the difference in pressure at said outlet with respect to said inlet; said visual indicator including two vertically-extending tubes joined to said housing at said inlet and outlet, respectively, such that the level of the water in each of said tubes indicates the water pressure thereat.

6. The system according to claim 3, wherein said housing includes a limit for limiting the displacement of said displaceable member to prevent it from completely closing the outlet; said limit comprising a plurality of axially-extending, circumferentially-spaced stops projecting from the inlet face of the housing adjacent said outlet.

7. The system according to claim 3, wherein said displaceable member is a valve assembly slidable within said housing to restrict or enlarge said passageway.

8. The system according to claim 7, wherein said passageway includes a cylindrical bore of the housing, and an internal chamber between said cylindrical bore and said inlet and of larger transverse dimension than that of said cylindrical bore; said valve assembly including a guiding stem slidable within said cylindrical bore, and an enlarged valve member located within said internal chamber and cooperable with an internal surface thereof for restricting or enlarging said passageway.

9. The system according to claim 8, wherein said guiding stem is of a spider cross-section.

10. The system according to claim 8, wherein said internal surface of the internal chamber is of a tapered configuration, increasing in transverse dimension towards the outlet.

11. The system according to claim 1, wherein said water utilization devices are water drinkers for poultry.

12. The system according to claim 1, wherein a line pressure regulator is included in said water supply conduit at the inlet end thereof.

13. A method of supplying water to a plurality of water utilization devices supported above a floor extending at a predetermined slope from one end to the opposite end thereof, comprising: extending a water supply conduit over said floor substantially parallel thereto so as to have substantially the same slope as the floor; connecting a plurality of pressure reducers into said water supply conduit at spaced intervals along the length thereof, each pressure reducer introducing a fixed pressure drop, irrespective of the water pressure in the water supply conduit, reducing the water pressure in the water supply conduit a predetermined amount according to the slope of the span of the water supply conduit from that pressure reducer to the next adjacent pressure reducer upstsream of the water supply conduit, thereby obviating the need for readjusting the pressure reducers when changing flow rates to the water utilization devices; and connecting a plurality of water utilization devices to said water supply conduit at spaced intervals along the length thereof.

14. The method according to claim 13, wherein said pressure reducers are connected into the water supply conduit at equally-spaced intervals and reduce the water pressure equal amounts.

15. The method according to claim 13, wherein said water utilization devices are water drinkers for poultry.

16. The method according to claim 13, wherein a line pressure regulator is included in the water supply conduit at the inlet end thereof.

17. A pressure reducer, comprising:

a housing having an inlet, an outlet, and a passageway connecting the inlet to the outlet;

a valve assembly slidable within said housing and located so as to be urged by the pressure of the inlet to enlarge said passageway, and by the pressure at the outlet to restrict said passageway;

and a spring continuously biassing said valve assembly by a constant force, corresponding to a predetermined pressure drop to be introduced by the pressure reducer, to restrict said passageway, irrespective of the pressure at said inlet such that changes in the outlet pressure follow those in the inlet pressure;

said passageway including a cylindrical bore and an internal chamber between said cylindrical bore and said inlet;

said internal chamber being of larger transverse dimension than that of said cylindrical bore;

said valve assembly including a guiding stem slidable within said cylindrical bore, and an enlarged valve member located within said internal chamber and cooperable with an internal surface thereof for restricting or enlarging said passageway;

said housing further including a vertically-extending tube joined to the housing at said outlet such that the level of the water in said tube indicates the water pressure at said outlet.

18. The pressure reducer according to claim 17, wherein said internal surface of the internal chamber is of a tapered configuration, increasing in transverse dimension towards the outlet.

19. The pressure reducer according to claim 17, wherein said housing further includes a second vertically-extending tube joined to said housing at said inlet such that the levels of the water in said tubes indicate the difference in the water pressure at said outlet with respect to said inlet.

20. The pressure reducer according to claim 17, wherein said housing includes a limit for limiting the displacement of said displaceable member to prevent it from completely closing the outlet; said limit comprising a plurality of axially-extending, circumferentially-spaced stops projecting from the inlet face of the housing adjacent said outlet.

* * * * *